US007619642B2

(12) United States Patent
Matsuyama et al.

(10) Patent No.: US 7,619,642 B2
(45) Date of Patent: Nov. 17, 2009

(54) IMAGE FORMING APPARATUS

(75) Inventors: Kengo Matsuyama, Osaka (JP); Norio Tomita, Nara (JP); Yoshikazu Harada, Nara (JP); Kenji Tanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 378 days.

(21) Appl. No.: 11/371,975

(22) Filed: Mar. 8, 2006

(65) Prior Publication Data

US 2006/0203070 A1 Sep. 14, 2006

(30) Foreign Application Priority Data

Mar. 8, 2005 (JP) ............................ 2005-064291

(51) Int. Cl.
*B41J 2/385* (2006.01)
*B41J 2/415* (2006.01)
*G01D 15/06* (2006.01)
*G03G 15/01* (2006.01)

(52) U.S. Cl. ....................... 347/118; 347/116; 347/119; 347/124; 399/179

(58) Field of Classification Search ................. 347/116, 347/118, 119, 124; 399/179
See application file for complete search history.

(56) References Cited

U.S. PATENT DOCUMENTS 6,163,327 A * 12/2000 Mori et al. .................. 347/115
6,593,951 B2 * 7/2003 Yokoyama et al. .......... 347/138
6,864,906 B2 * 3/2005 Yokoyama .................. 347/119

FOREIGN PATENT DOCUMENTS

| | | |
|---|---|---|
| JP | 04-149478 | 5/1992 |
| JP | 09-146329 | 6/1997 |
| JP | 2001-142278 | 5/2001 |

* cited by examiner

*Primary Examiner*—Stephen D Meier
*Assistant Examiner*—Kar Yip
(74) *Attorney, Agent, or Firm*—Edwards Angell Palmer & Dodge LLP; David G. Conlin; Peter J. Manus

(57) ABSTRACT

An image forming apparatus in which a plurality of color component images of different colors, which include a reference color (e.g. black) serving as a reference and adjustment colors (e.g. cyan, magenta and yellow) to be adjusted, are formed on respective photosensitive drums and then transferred to a transfer belt. Respective positions of the color component images transferred to the transfer belt are detected by a CCD. Timing adjustment can be performed so that the difference between the detected position of each of the color component images and a prescribed position is not more than a predetermined value, based on the reference color image as the reference. In this case, the color component images are formed on the corresponding photosensitive drums with the same timing by utilizing a single polygon mirror.

20 Claims, 11 Drawing Sheets

IMAGE FORMING APPARATUS

CROSS-REFERENCE TO RELATED APPLICATIONS

This Nonprovisional application claims priority under 35 U.S.C. §119(a) on Patent Application No. 2005-064291 filed in Japan on Mar. 8, 2005, the entire contents of which are hereby incorporated by reference.

BACKGROUND OF THE INVENTION

1. Field of the Invention

The present invention relates to an image forming apparatus for forming an image containing a plurality of color components, i.e., a color image by forming color component images of different colors on corresponding image carriers and then transferring the color component images formed on the image carriers to a transfer medium. The invention particularly relates to an image forming apparatus which performs timing adjustment especially for registering the color component images.

2. Description of Related Art

As an apparatus for forming a color image on a paper, an image forming apparatus is known which individually forms color component images of e.g. black, cyan, magenta and yellow on corresponding photosensitive drums and then transferring the images to a transfer belt in a superimposed manner. In such an image forming apparatus, the forming of the color component images on the corresponding photosensitive drums is performed by reflecting laser beams outputted from a plurality of laser diodes by a plurality of polygon mirrors corresponding to the photosensitive drums to direct the laser beams to the photosensitive drums. Another type of image forming apparatus having a reduced number of polygon mirrors is also known in which laser beams from a plurality of laser diodes are directed to a common, i.e., a single polygon mirror, and the laser beams reflected by the single polygon mirror are directed to the corresponding photosensitive drums.

However, such an image forming apparatus has a problem that the image quality is degraded due to the misregistration of the color component images transferred to the transfer belt. Therefore, an image forming apparatus is known in which an image utilized for adjusting the timing of image forming (hereinafter referred to as "mark") is formed and the position of the mark is detected to perform the timing adjustment based on the detected position (See Japanese Patent Application Laid-Open No. 4-149478 (1992), for example).

In the above-described image forming apparatus which uses a single polygon mirror, respective marks for the different color components, i.e. black, cyan, magenta and yellow, for example, are successively formed on a moving transfer belt, so that the timings at which the marks are formed differ among the color components. Therefore, the laser beams for the color components are not always reflected by the same surface of the polygon mirror, which poses a problem that the positions of the marks may deviate due to the individual difference among the surfaces of the polygon mirror. There is another problem that, in forming the marks of respective color components, the variation of the rotation speed of the belt driving roller for driving the transfer belt or the photosensitive drum causes the positional deviation of the marks.

BRIEF SUMMARY OF THE INVENTION

An object of the present invention, which is conceived in view of these circumstances, is to provide an image forming apparatus which is capable of performing timing adjustment for image forming with high accuracy by causing a plurality of color component images to be formed on respective image carriers with the same timing.

Another object of the present invention is to provide an image forming apparatus having a structure in which respective light beams corresponding to the image carriers are directed to a single polygon mirror and capable of accurately forming a reference color image and an adjustment color image without receiving the influence of individual difference among the respective reflecting surfaces of the polygon mirror or the rotational angle error, for example.

Another object of the present invention is to provide an image forming apparatus having a structure in which a plurality of color component images of a same color are formed on a transfer medium and capable of reducing the influences of e.g. errors generated irregularly in forming the color component images and accurately detecting the forming position of the color component images.

Another object of the present invention is to provide an image forming apparatus having a structure in which a plurality of color component images of a same color are formed on a transfer medium and capable of reducing the influences of errors generated in each rotation period such as periodic variation of the rotation speed of the photosensitive drum and performing the timing adjustment of image forming with high accuracy.

Another object of the present invention is to provide an image forming apparatus having a structure in which a plurality of color component images of a same color are formed on a transfer medium and capable of duly correcting color misregistration occurring in the rotation period of the photosensitive drums by selecting the maximum value and the minimum value from the differences between respective detected positions of the color component images formed on the transfer belt and the positions corresponding to a predetermined interval and determining the reference rotational angle position, that is a rotational angle position where image forming timing on the transfer belt coincides, based on the intermediate value between the maximum value and the minimum value selected.

Another object of the present invention is to provide an image forming apparatus having a structure in which, utilizing the reference color image as the reference, the timing adjustment of image forming is performed so that the difference between the detected position and the prescribed position of each of the adjustment color images is not more than a predetermined value determined with respect to each of adjustment colors, and capable of performing the adjustment with respect to a color whose misregistration is likely to stand out even if the degree of misregistration of the color is smaller than the misregistration of other colors.

Another object of the present invention is to provide an image forming apparatus having a structure in which a plurality of photosensitive drums corresponding to the color components other than the reference color component are rotated by a common motor and capable of preventing color misregistration of the photosensitive drums rotated by the common motor by performing timing adjustment of image forming with respect to the color component of which the difference between the detected position and the prescribed position is largest.

The image forming apparatus according to the present invention is an image forming apparatus which comprises: a plurality of image carriers; an image forming unit for forming each of color component images of a plurality of colors on a corresponding image carrier among the plurality of image carriers, respectively; a transfer medium to which each of color component images formed on each of the image carriers is to be transferred; a position detecting unit for detecting a position, on the transfer medium, of each of color component images transferred to the transfer medium; and a timing adjusting unit for adjusting timing at which each of color component images is to be formed on each of the image carriers, respectively, by the image forming unit based on the positions of each of color component images on the transfer medium detected by the position detecting unit; and is characterized in that the image forming unit includes: a plurality of irradiators for, with same timing, emitting light beams corresponding to each of the image carriers, respectively; and single polygon mirror for reflecting, by a same reflecting surface, the light beams emitted with the same timing from the plurality of irradiators toward the corresponding image carriers, respectively so that each of color component images is formed on each of the corresponding image carriers with same timing.

The image forming apparatus according to the present invention is characterized in that one of the plurality of color component images is determined as a reference color image serving as reference for adjustment, whereas other color component images are determined as adjustment color images which are to be adjusted, and the timing adjusting unit adjusts timing of image forming so that difference between a detected position of each of the adjustment color images on the transfer medium detected by the detecting unit and a prescribed position is not more than a predetermined value, based on a forming position of the reference color image on the transfer medium as reference.

In the above-described image forming apparatus of the present invention, in performing the timing adjustment of image forming, a plurality of color component images are formed on the respective image carriers with the same timing, so that the transfer of the color component images to the transfer medium is performed with the same timing. In this case, the interval between the color component images formed on the transfer medium becomes equal to the interval between the image carriers. Therefore, as compared with the method in which the color component images are formed on the respective image carriers with different timings, the influence of positional deviation generated in forming the respective color component images on the transfer medium is reduced, so that the timing adjustment of image forming can be performed with high accuracy. For example, the timing adjusting unit is capable of determining one of the color component images as the reference color image serving as the reference for adjustment while determining other color component images as adjustment color images which are to be adjusted, and adjusting the image forming timing so that the difference between the detected position and the prescribed position of each of the adjustment color images is not more than a predetermined value, utilizing the reference color image as the reference. Alternatively, the reference position can be determined with respect to each of the colors, and the timing adjustment of image forming can be performed so that the difference between the detected position and the reference position is not more than the predetermined value.

Moreover, in the above-described image forming apparatus of the present invention, the light beams corresponding to the image carriers are directed from a plurality of irradiators to a single polygon mirror, and the light beams reflected by the polygon mirror are directed to the corresponding image carriers. In this way, the light beams are reflected by the single polygon mirror. When light beams are emitted with the same timing from the plurality of irradiators to form a plurality of color component images on the respective image carriers with the same timing, the light beams are reflected by a same surface of the single polygon mirror. Therefore, the reference color image and the adjustment color images can be formed accurately without receiving the influence of individual difference among the respective reflecting surfaces of the polygon mirror or the rotational angle error, for example. Therefore, the timing adjustment of image forming can be performed with high accuracy.

The image forming apparatus according to the present invention is characterized in that the image forming unit forms a plurality of color component images of a same color on the transfer medium, and the position detecting unit detects positions of the plurality of color component images of the same color on the transfer medium, and calculates an average value of the detected positions as a position of each of color component images.

In the above-described image forming apparatus of the present invention, respective positions of a plurality of color component images of a same color formed on the transfer medium are detected, and the average value of the detected positions is calculated and determined as the position of the color component images. Therefore, the influence of errors generated in forming the respective color component images is reduced, and the forming positions of the color component images can be detected precisely. Therefore, the timing adjustment of image forming can be performed with high accuracy.

The image forming apparatus according to the present invention is characterized by further comprising: a rotational angle position detecting unit for detecting a rotational angle position of each of image carrier; and a reference rotational angle position detecting unit for detecting a reference rotational angle position that is a rotational angle position where image forming timing on the transfer medium by the image carrier as a photosensitive drum having cylindrical shape coincides, wherein the image forming unit forms a plurality of color component images of a same color on the transfer medium, the position detecting unit detects positions of the plurality of color component images of the same color on the transfer medium, the reference rotational angle detecting unit detects the reference rotational angle position of each the image carrier based on the positions of the plurality of color component images of the same color detected by the position detecting unit, and the timing adjusting unit adjusts the image forming timing by determining the reference rotational angle position corresponding to the adjustment color with respect to the reference rotational angle position corresponding to the reference color so as to coincide the image forming timing on the transfer medium, based on the rotational angle position of each of the image carrier detected by the rotational angle position detecting unit and the reference rotational angle position of each of the image carrier detected by the reference rotational angle position detecting unit.

In the above-described image forming apparatus, each of the image carriers comprises a cylindrical photosensitive drum. The position of each of the color component images formed on the transfer medium is detected, and the reference rotational angle position, that is a rotational angle position where timing of image forming on the transfer belt coincides, of the corresponding photosensitive drum is detected based on the detected position. The timing adjustment of image forming is performed by determining the reference rotational angle position of each transfer medium so as to coincide the image forming timing of the reference image and that of the adjustment color image on the transfer belt coincide with each other. Therefore, the influences of errors generated in each rotation period such as periodic variation of the rotation speed of the photosensitive drum can be reduced, and the timing adjustment of image forming can be performed with high accuracy.

The image forming apparatus according to the present invention is characterized in that the image forming unit forms each of color component images at a predetermined interval, and the reference rotational angle position detecting unit selects a maximum value and a minimum value from differences between forming positions of each of color component images formed on the transfer medium detected by the position detecting unit and position corresponding to the predetermined interval, calculates an intermediate value between the selected maximum value and the selected minimum value, and detects the reference rotational angle position based on the calculated intermediate value.

In the above-described image forming apparatus of the present invention, with respect to each color, a plurality of color component images are formed at a predetermined interval, and a maximum value and a minimum value are selected from the differences between respective forming positions of the color component images of a same color on the transfer belt and positions corresponding to the predetermined interval. Then, an intermediate value between the maximum value and the minimum value is calculated, and the reference rotational angle position is detected based on the calculated intermediate value. Therefore, the error occurring in the rotation period of the photosensitive drum can be corrected. For example, the cycle of color misregistration which occurs periodically due to the eccentricity of the photosensitive drum substantially corresponds to the rotation period of the photosensitive drum. In the case of such color misregistration in the rotation period, even if the maximum value and the minimum value vary, the intermediate value between the maximum value and the minimum value does not vary much. Therefore, by utilizing the reference rotational angle position based on the intermediate value, the color misregistration occurring in the rotation period of the photosensitive drum can be duly corrected.

The image forming apparatus according to the present invention is characterized in that the predetermined value differs among color components.

In the above-described image forming apparatus, the timing adjustment of image forming is performed so that, utilizing the reference color image as the reference, the difference between the detected position and the prescribed position of each adjustment color image is not more than a predetermined value which is determined with respect to each of the adjustment colors. Therefore, with respect to a color whose misregistration is likely to stand out, the adjustment can be performed even if the degree of misregistration of the color is smaller than the misregistration of other colors. For example, in the case where the reference color is black whereas the adjustment colors are magenta, cyan and yellow, the predetermined value for magenta may be set smaller than those of other colors so that the misregistration of magenta can be dealt with more sensitively than that of other adjustment colors, because the misregistration of magenta is likely to stand out as compared with that of other adjustment colors.

The image forming apparatus according to the present invention is characterized in that at least two of the plurality of image carriers comprise photosensitive drums rotated by a common motor, and the timing adjusting unit adjusts timing of image forming with respect to a color component of which difference between the detected position and the prescribed position is largest among the color components corresponding to the plurality of photosensitive drums rotated by the common motor.

In the above-described image forming apparatus, the image carriers include a plurality of photosensitive drums rotated by a common motor, and the timing adjustment of image forming is performed with respect to a color component of which the difference between the detected position and the prescribed position is largest among the color components corresponding to the photosensitive drums rotated by the common motor. Therefore, the color misregistration of the plurality of photosensitive drums rotated by the common motor can be prevented. Moreover, unlike the structure in which the photosensitive drums are driven by individual motors, variations of the rotation speed do not actually occur among the photosensitive drums, because the photosensitive drums are rotated by a common motor.

The above and further objects and features of the invention will more fully be apparent from the following detailed description with accompanying drawings.

DETAILED DESCRIPTION OF THE PRESENT INVENTION

The present invention will be described below in detail based on the drawings showing the embodiments.

Figure 1:
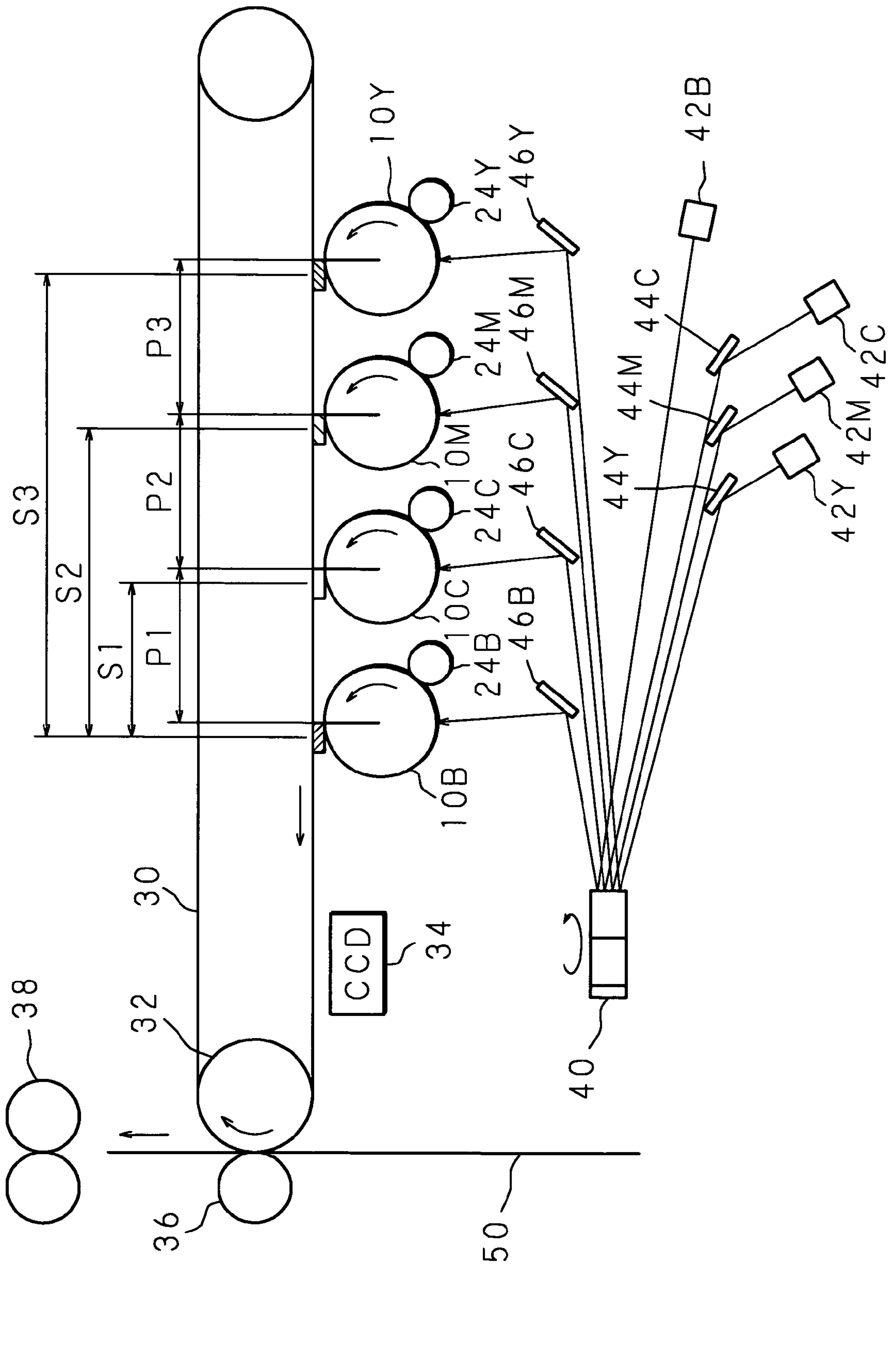
FIG. 1 is a schematic view showing the principal structure of an image forming apparatus according to the present invention.

FIG. 1 is a schematic view showing the principal structure of an image forming apparatus according to the present invention. The image forming apparatus according to the present invention is provided with, as the main structural elements, a plurality of photosensitive drums (image carriers) 10 on which images are to be formed as electrostatic latent images, a plurality of laser diodes (irradiators) 42 for outputting laser beams (light beams), a plurality of first mirrors 44, a single polygon mirror 40 and a plurality of second mirrors 46 for guiding the laser beams outputted from the plurality of laser diodes 42 to the plurality of photosensitive drums 10, a plurality of developing rollers 24 for developing the latent images respectively formed on the photosensitive drums 10 by laser beams, and a transfer belt (transfer medium) 30 onto which images formed on the plurality of photosensitive drums 10 are to be transferred.

The plurality of photosensitive drums 10 include photosensitive drums 10B, 10C, 10M and 10Y for black, cyan, magenta and yellow, respectively. Similarly, the plurality of developing rollers 24 include developing rollers 24B, 24C, 24M and 24Y for black, cyan, magenta and yellow, respectively. The laser diodes 42 include laser diodes 42B, 42C, 42M and 42Y for black, cyan, magenta and yellow, respectively.

The first mirrors 44 include first mirrors 44C, 44M and 44Y for cyan, magenta and yellow, respectively, for guiding the laser beams outputted from the laser diodes 42C, 42M and 42Y for cyan, magenta and yellow to the polygon mirror 40. Note that, the laser beam outputted from the laser diode 42B for black is made to be irradiated directly to the polygon mirror 40. The second mirrors 46 include second mirrors 46B, 46C, 46M and 46Y for black, cyan, magenta and yellow, respectively, for guiding the laser beams reflected by the polygon mirror 40 to the photosensitive drums 10B, 10C, 10M and 10Y for black, cyan, magenta and yellow, respectively. By combining the plurality of mirrors in this way, the irradiation points (beam spots) of the laser beams, which are emitted from the plurality of laser diodes 42 spaced from each other, can be made close to each other so that the laser beams can become incident on a same reflection surface of the polygon mirror 40.

The transfer belt 30 is formed in a loop. The photosensitive drums 10B, 10C, 10M and 10Y for respective color components are aligned to face an obverse surface of the transfer belt 30. When a belt drive roller 32 inscribing the transfer belt 30 drives the transfer belt 30, the image transferred to the transfer belt 30 moves from right to left in FIG. 1 relative to the photosensitive drums 10. A CCD (Charge Coupled Device) 34 is arranged to face the obverse surface of the transfer belt 30. In addition, the CCD 34 is arranged downstream side of the photosensitive drums 10 in the belt movement direction. The photosensitive drums 10 are arranged upstream side, in the belt movement direction, of the CCD 34 in the order of the photosensitive drum 10B for black, the photosensitive drum 10C for cyan, the photosensitive drum 10M for magenta and the photosensitive drum 10Y for yellow.

A transfer roller 36 is arranged to face the belt drive roller 32 sandwiching the transfer belt 30. Between the transfer roller 36 and the transfer belt 30 passes a paper 50, onto which an image is transferred from the transfer belt 30 and fixed by a fixing roller 38.

Figure 2:
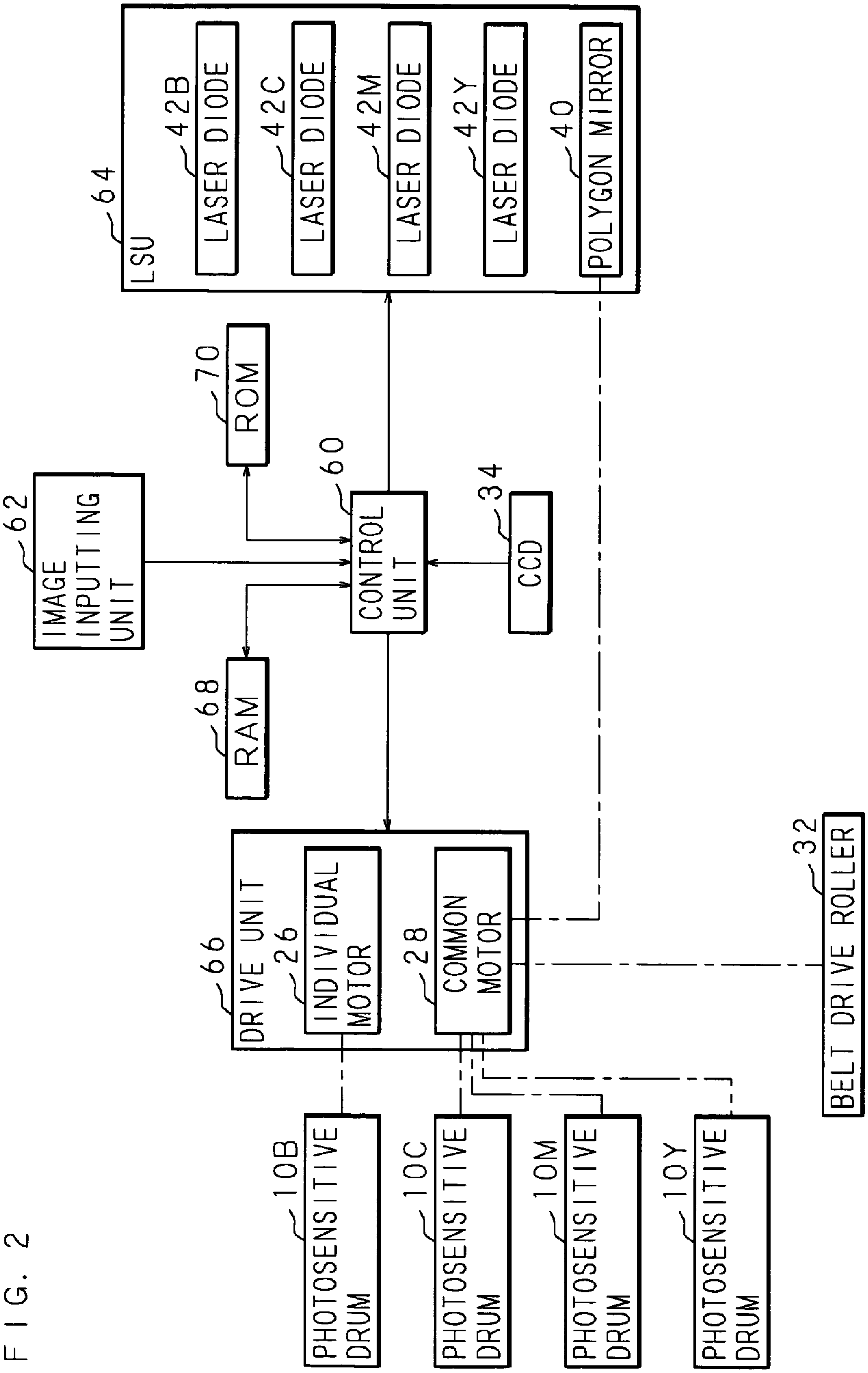
FIG. 2 is a block diagram showing the control system of the image forming apparatus according to the present invention.

FIG. 2 is a block diagram showing the control system of the image forming apparatus according to the present invention. The control system of the image forming apparatus comprises an LSU (Laser Scanning unit) 64 including the laser diodes 42B, 42C, 42M, 42Y and the polygon mirror 40, the CCD 34 for detecting an image for adjusting the timing of image forming (hereinafter referred to as "mark") formed on the transfer belt 30, a drive unit 66 for driving the photosensitive drums 10, the belt drive roller 32 and the polygon mirror 40, an image inputting unit 62 such as a scanner for reading an original image, a control unit 60 connected to the CCD 34, the LSU 64, the drive unit 66 and the image inputting unit 62 as mentioned above and configured by, for example, a CPU (Central Processing Unit), and a RAM 68 and a ROM 70 connected to the control unit 60. The control unit 60 controls each structural unit of the apparatus based on the program and data stored in the ROM 70.

The drive unit 66 includes a motor (not shown) for driving the polygon mirror 40, a motor (not shown) for driving the belt drive roller 32, an individual motor 26 for driving the photosensitive drum 10B for black and a common motor 28 for driving the photosensitive drums 10C, 10M and 10Y for color components other than black.

Figure 3:
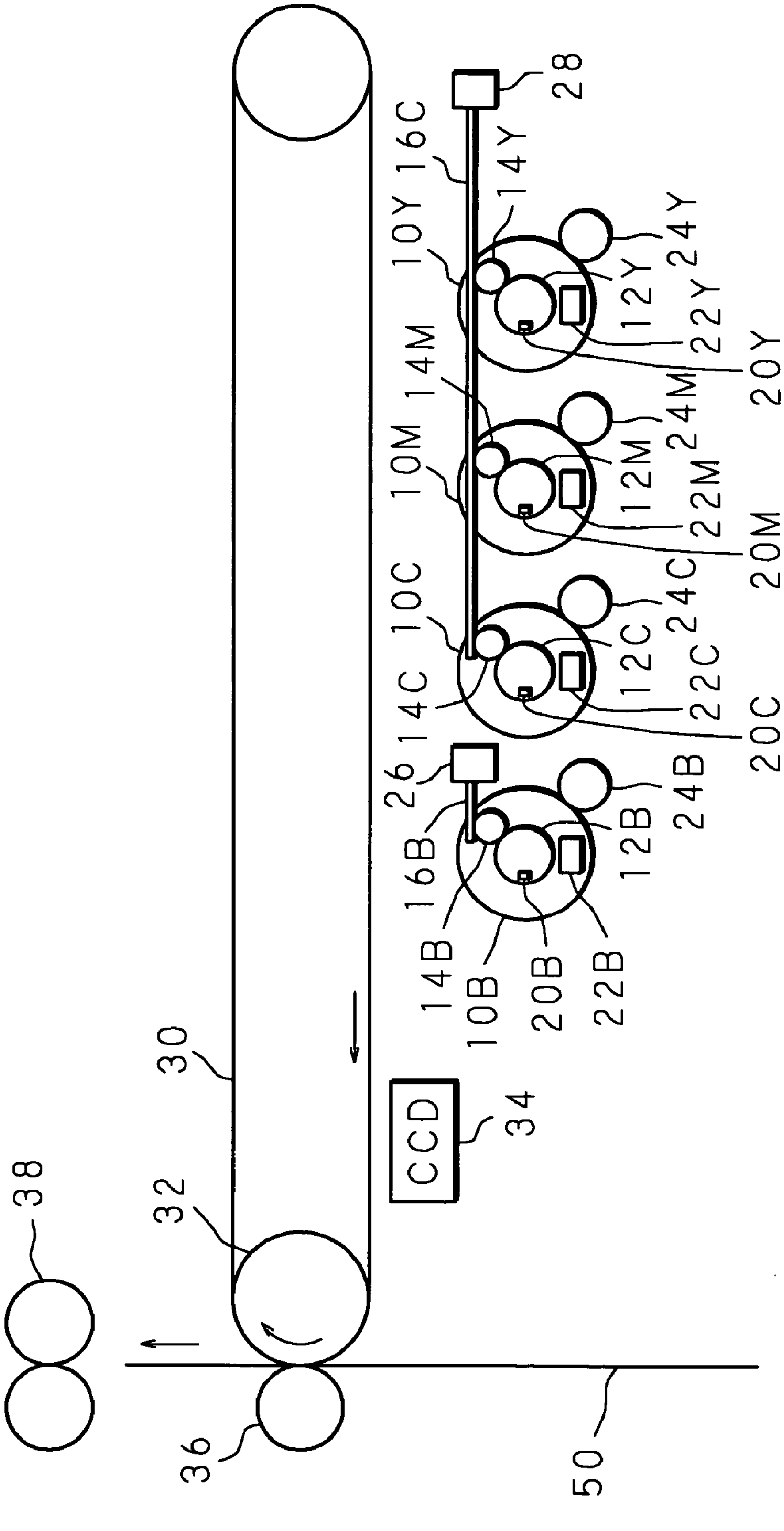
FIG. 3 is a schematic view showing a constitutional example of photosensitive drums and a driving system for driving the photosensitive drums.

FIG. 3 is a schematic view showing a constitutional example of photosensitive drums and a driving system for driving the photosensitive drums. The photosensitive drums 10B, 10C, 10M and 10Y include spur gears 12B, 12C, 12M and 12Y which are fixed to rotating shafts (not shown) serving as the rotational center, respectively, and worm wheels 14B, 14C, 14M and 14Y meshing with the spur gears 12B, 12C, 12M and 12Y, respectively. The worm wheel 14B for black meshes with a worm 16B driven by the individual motor 26. Each of the worm wheels 14C, 14M and 14Y for color components other than black meshes with a worm 16C which is driven simultaneously by the common motor 28. Therefore, the photosensitive drum 10B is rotated by the individual motor 26, whereas the photosensitive drums 10C, 10M and 10Y are simultaneously rotated by the common motor 28.

The rotating shafts, to which spur gears 12B, 12C, 12M and 12Y are fixed, respectively, of the photosensitive drums 10C, 10M and 10Y are rotatably supported by a frame of a body of the image forming apparatus. The spur gears 12B, 12C, 12M and 12Y are provided with ribs 20B, 20C, 20M and 20Y, respectively. Corresponding to each rib 20B, 20C, 20M and 20Y, rib sensors 22B, 22C, 22M and 22Y are provided at positions where same positional relationship with respect to each photosensitive drums 10B, 10C, 10M and 10Y on the frame of the body of the image forming apparatus are determined, respectively. Each of the rib sensors 22B, 22C, 22M and 22Y is provided with a light emitting unit and a light receiving unit, for example, to detect that the light is blocked by the passing of the corresponding rib 20B, 20C, 20M or 20Y between the light emitting unit and the light receiving unit.

Each of the rib sensors 22B, 22C, 22M and 22Y output a predetermined signal at the timing when corresponding rib 20B, 20C, 20M or 20Y passes between the respective light emitting unit and the respective light receiving unit, respectively. Accordingly, these predetermined signals are synchronized signals which are synchronized with the rotations of the photosensitive drums 10B, 10C, 10M and 10Y, respectively. Based on these synchronized signals, the control unit 60 can obtain the rotational angle position of each photosensitive drums 10B, 10C, 10M and 10Y. Accordingly, each of the rib sensors 22B, 22C, 22M and 22Y functions as a rotational angle position detecting unit.

The LSU 64 functions as an image forming unit for forming a reference mark (reference color image) of black serving as the reference and adjustment marks (adjustment color images) of cyan, magenta and yellow to be adjusted on the photosensitive drums 10 corresponding to each color component. The CCD 34 and the control unit 60 function as a position detecting unit for detecting the position of each of the marks (color component images) transferred to the transfer belt 30. The control unit 60 functions as a timing adjusting unit for adjusting the timing of image forming by controlling the LSU 64 so that the difference between the detected position of each of the adjustment marks and a prescribed position based on the reference mark is not more than a predetermined value. The above-described predetermined value differs among the color components, and the value for yellow is largest, while the value for magenta is smallest, for example.

In this embodiment, the photosensitive drums 10C, 10M and 10Y corresponding to cyan, magenta and yellow, respectively, are rotated simultaneously by the common motor 28. Therefore, the timing adjustment of image forming is performed with respect to the color component whose difference between the detected position and the prescribed position is largest and the difference is larger than the above-described predetermined value.

In performing the timing adjustment of image forming, the control unit 60 controls the LSU 64 so that each laser diodes 42 emit light with the same timing to form the marks of respective color components on each photosensitive drums 10B, 10C, 10M and 10Y with the same timing, respectively. Therefore, the laser beams of respective color components emitted from the laser diodes 42 are reflected at the same reflection surface of the polygon mirror 40 toward the respective photosensitive drums 10. Therefore, as shown in FIG. 1, the marks of black, cyan, magenta and yellow are transferred to the transfer belt 30 with the same timing. In this case, an interval between the marks transferred to the transfer belt 30 becomes equal to an interval between the photosensitive drums 10.

The control unit 60 adjusts the image forming timing for cyan so that an interval Si between the reference mark (black) and the adjustment mark of cyan becomes substantially equal to (i.e. the difference is smaller than a predetermined value) an interval P1 between the photosensitive drum 10B for black and the photosensitive drum 10C for cyan. Similarly, the control unit 60 adjusts the image forming timing for magenta so that an interval S2 between the reference mark (black) and the adjustment mark of magenta becomes substantially equal to (i.e. the difference is smaller than a predetermined value) an interval (P1+P2) between the photosensitive drum 10B for black and the photosensitive drum 10M for magenta. In addition, the interval P2 is an interval between the photosensitive drum 10C for cyan and the photosensitive drum 10M for magenta. Further similarly, the control unit 60 adjusts the image forming timing for yellow so that an interval S3 between the reference mark (black) and the adjustment mark of yellow becomes substantially equal to (i.e. the difference is smaller than a predetermined value) an interval (P1+P2+P3) between the photosensitive drum 10B for black and the photosensitive drum 10Y for yellow. In addition, the interval P3 is an interval between the photosensitive drum 10M for magenta and the photosensitive drum 10Y for yellow.

Herein, as the position of each color component image, the average value between the front end position and the rear end position of the mark in the mark movement direction which are detected by the CCD 34 is used. The average value is calculated by the control unit 60 and stored in the RAM 68. The stored average value is used as the position of the color component image. It is to be noted that the position of the mark is expressed as the time period from a certain time point to the time point detected by the CCD 34.

Figure 4:
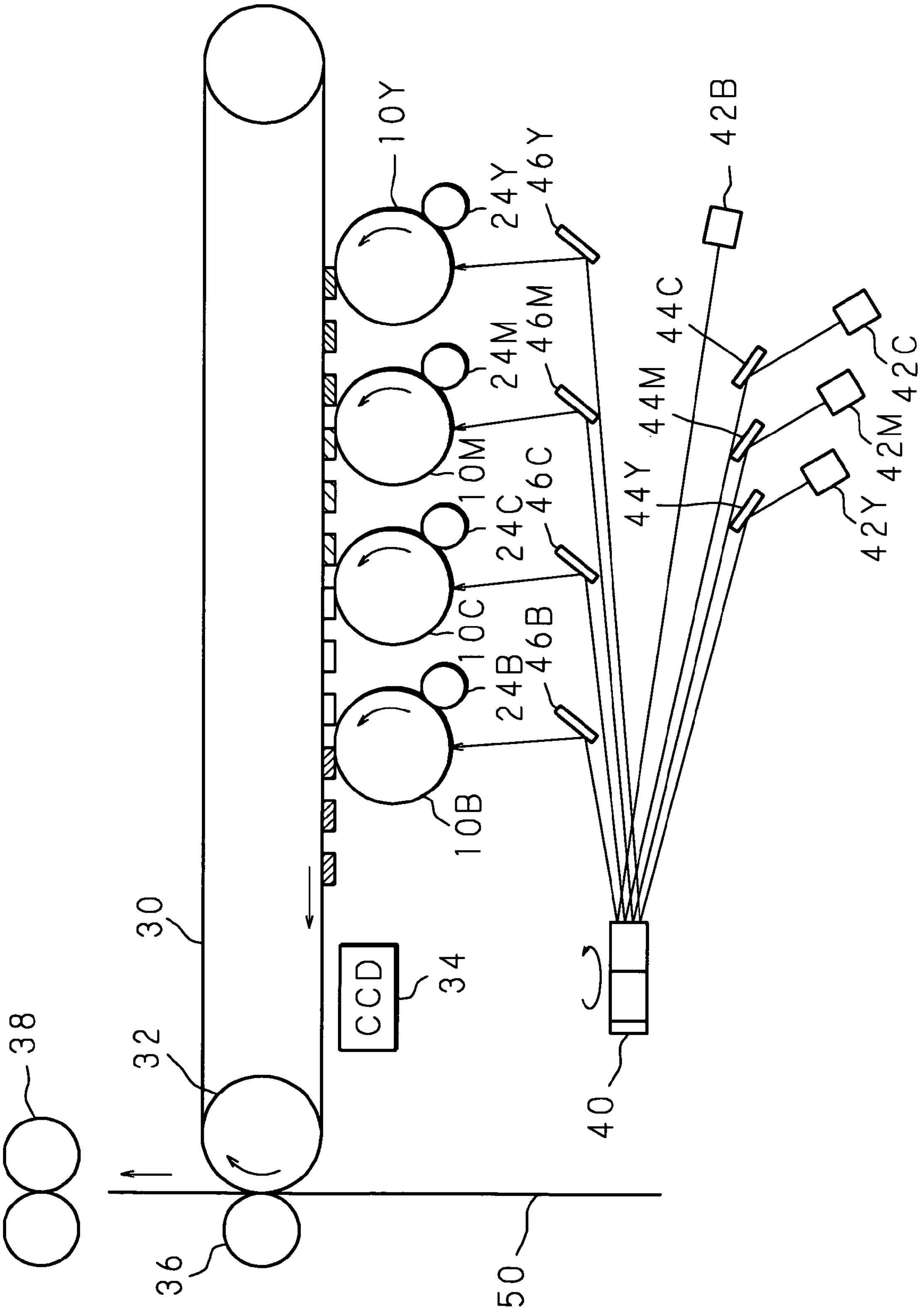
FIG. 4 is a schematic view showing an example in which a plurality of marks of a same color is formed on the transfer belt.

In this embodiment, in performing the timing adjustment of image forming, the LSU 64, under the control of the control unit 60, forms a plurality of marks of a same color on the transfer belt 30. FIG. 4 is a schematic view showing an example in which a plurality of marks of a same color is formed on the transfer belt 30. In the example shown in FIG. 4, with respect to each color, three marks are successively formed on the transfer belt 30. The control unit 60 calculates the average value of the positions of the marks of a same color detected by the CCD 34. Specifically, the average value of an interval between the first reference mark (black) and the first adjustment mark of cyan, an interval between the second reference mark and the second adjustment mark of cyan and an interval between the third reference mark and the third adjustment mark of cyan is calculated. The average value calculated in this way is made to be the interval S1 between the reference mark (black) and the adjustment mark of cyan.

Each of the photosensitive drums 10 is cylindrical, and the control unit 60 serves as a detecting unit for detecting the reference rotational angle position of each photosensitive drum 10 based on the positions of the respective marks of the same color. Then, the control unit 60 adjusts the image forming timing for the adjustment color by determining the reference rotational angle position corresponding to the adjustment color with respect to the reference rotational angle position corresponding to the reference color so as to coincide the image forming timing on the transfer belt 30.

Figure 5A:
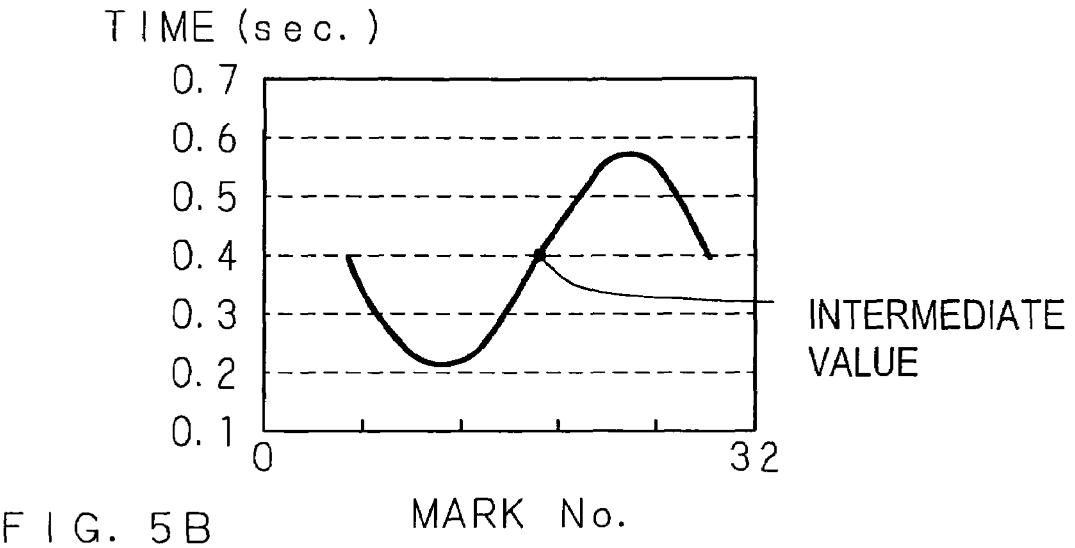
FIG. 5A, FIG. 5B and FIG. 5C are conceptual illustration showing examples of intermediate value for respective adjustment colors.
Figure 5B:
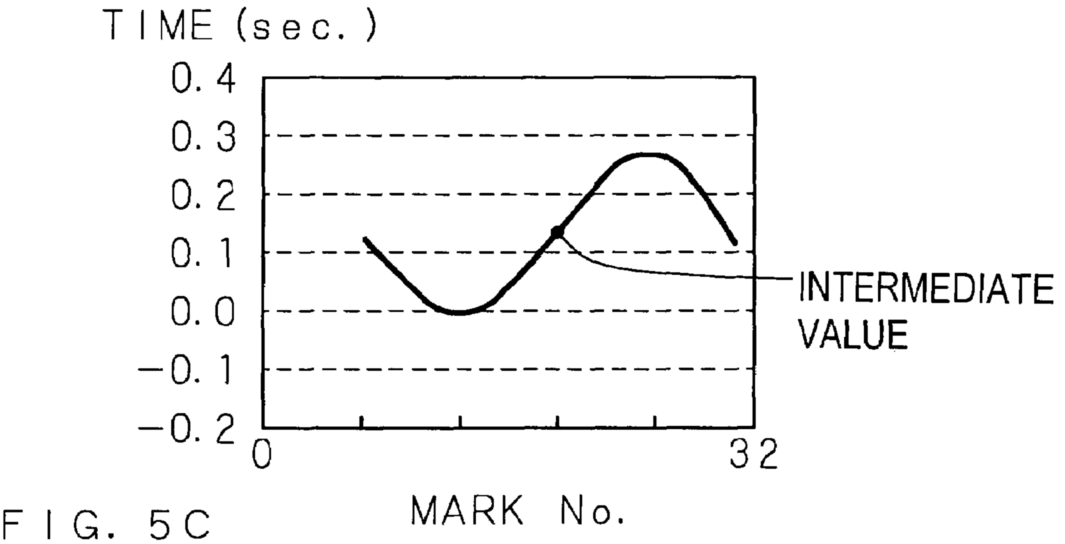
Figure 5C:
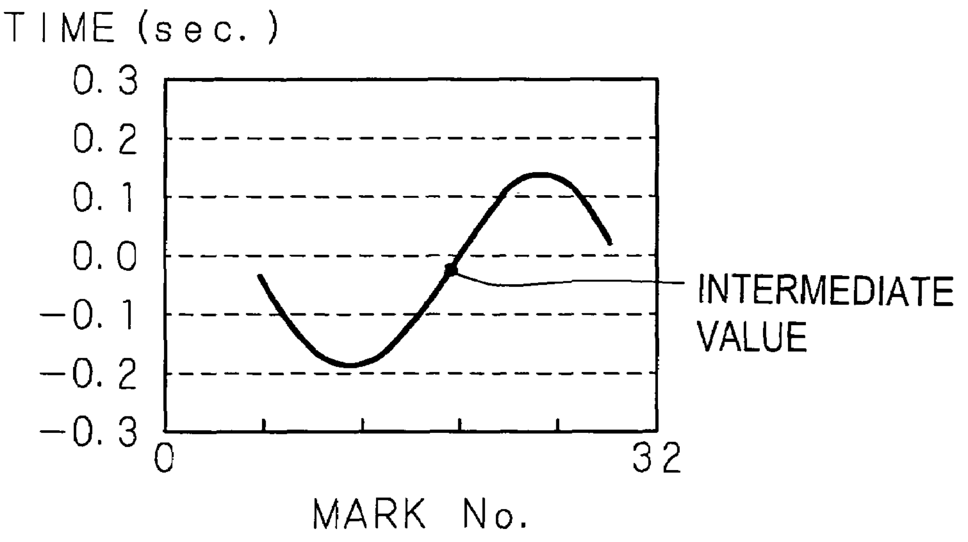

FIG. 5A, FIG. 5B and FIG. 5C are conceptual illustration showing examples of intermediate value of the photosensitive drum 10 for each adjustment color. A plurality of reference marks and a plurality of adjustment marks for each color are formed on the transfer belt 30 at a predetermined interval under the control of the control unit 60. The control unit 60 also has selecting function for detecting the reference marks and the adjustment marks with respect to each color, comparing, with respect to each of the marks, the detected position at which the mark is actually detected on the transfer belt 30 and an expected position at which the mark is to be formed in accordance with the predetermined interval to find the difference therebetween, and selecting the maximum value and the minimum value from the differences. The control unit 60 further has calculating function for calculating the intermediate value between the selected maximum value and the selected minimum value. Then, the control unit 60 detects the reference rotational angle position of the photosensitive drum 10 based on the calculated intermediate value and stores the detected result in the RAM 68.

Specifically, the reference rotational angle position of the photo sensitive drum 10 is the rotational angle position of the photo sensitive drum 10 where the latent image of the image formed on the position of the detected intermediate value is written by the laser beam.

Also, the rotational angle position of the photosensitive drum 10 can be obtained from time difference between the time when the rib 20 is detected by the rib sensor 22 and the time when the laser diode 42 outputs the laser beam. Accordingly, the reference rotational angle position of the photosensitive drum 10 can be obtained from time difference between the time when the rib 20 is detected by the rib sensor 22 and the time when the latent image of the image formed on the position of above mentioned intermediate value is written by the laser beam on the photosensitive drum 10.

In FIG. 5A, FIG. 5B and FIG. 5C, with respect to each of the marks of the number plotted on the abscissa, the difference between the detected position and the expected position is plotted on the ordinate as time (sec.). Since the transfer belt 30 moves at a constant speed, the difference between the positions on the transfer belt 30 can be expressed as the difference between detected times of the mark detected by the CCD 34. Specifically, the time difference between the time point at which the mark is actually detected by the CCD 34 and the time point at which the mark should be detected represents the deviation of the forming position of the mark.

Figure 6:
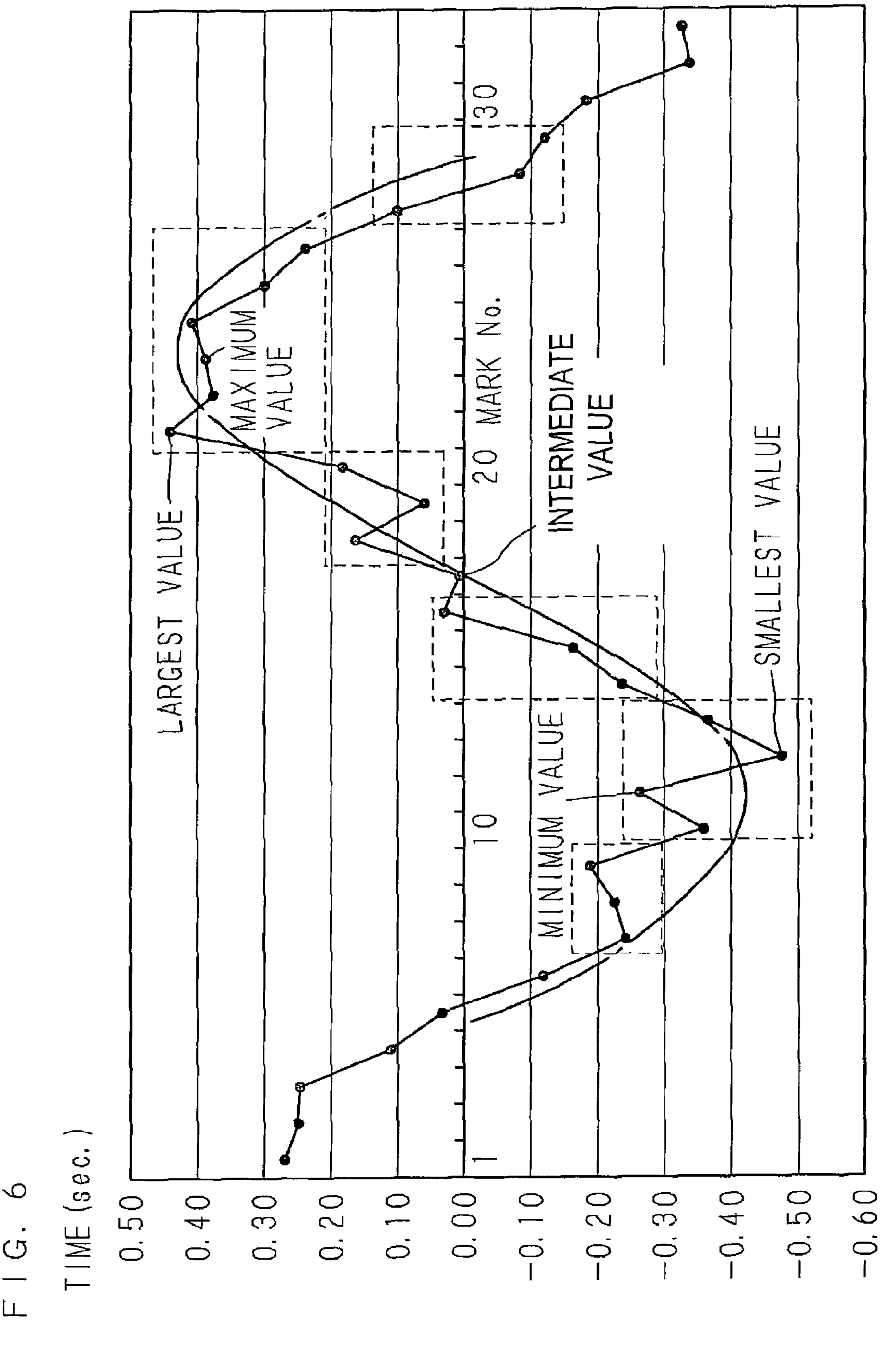
FIG. 6 is a conceptual illustration showing an example of selection of a minimum value and a maximum value.

FIG. 6 is a conceptual illustration showing an example of selection of the minimum value and the maximum value. Hereinafter, the difference between the largest value and the smallest value or the difference between the maximum value and the minimum value is referred to as amplitude. As the minimum value, the control unit 60 selects the middle data among the data included in the range of from the smallest value to "smallest value+amplitude/4". When there exist a plurality of middle data, the control unit 60 calculates the average values of the data in both ranges which adjoining the right and left of the above-described range and each of which includes 8.3% of the total number of data. Then, the control unit 60 select, as the minimum value, the middle data in the range whose average value is smaller. The maximum value is selected in a similar way.

It is noted that above mentioned 8.3% corresponds to 30° with respect to one cycle (360°) of the photosensitive drum (30/360=0.83). Specifically, at selecting the minimum value and maximum value, sufficient result can be obtained when data included in a range of 30° among whole data included in one cycle (360°) of the photosensitive drum 10 are used.

Figure 7:
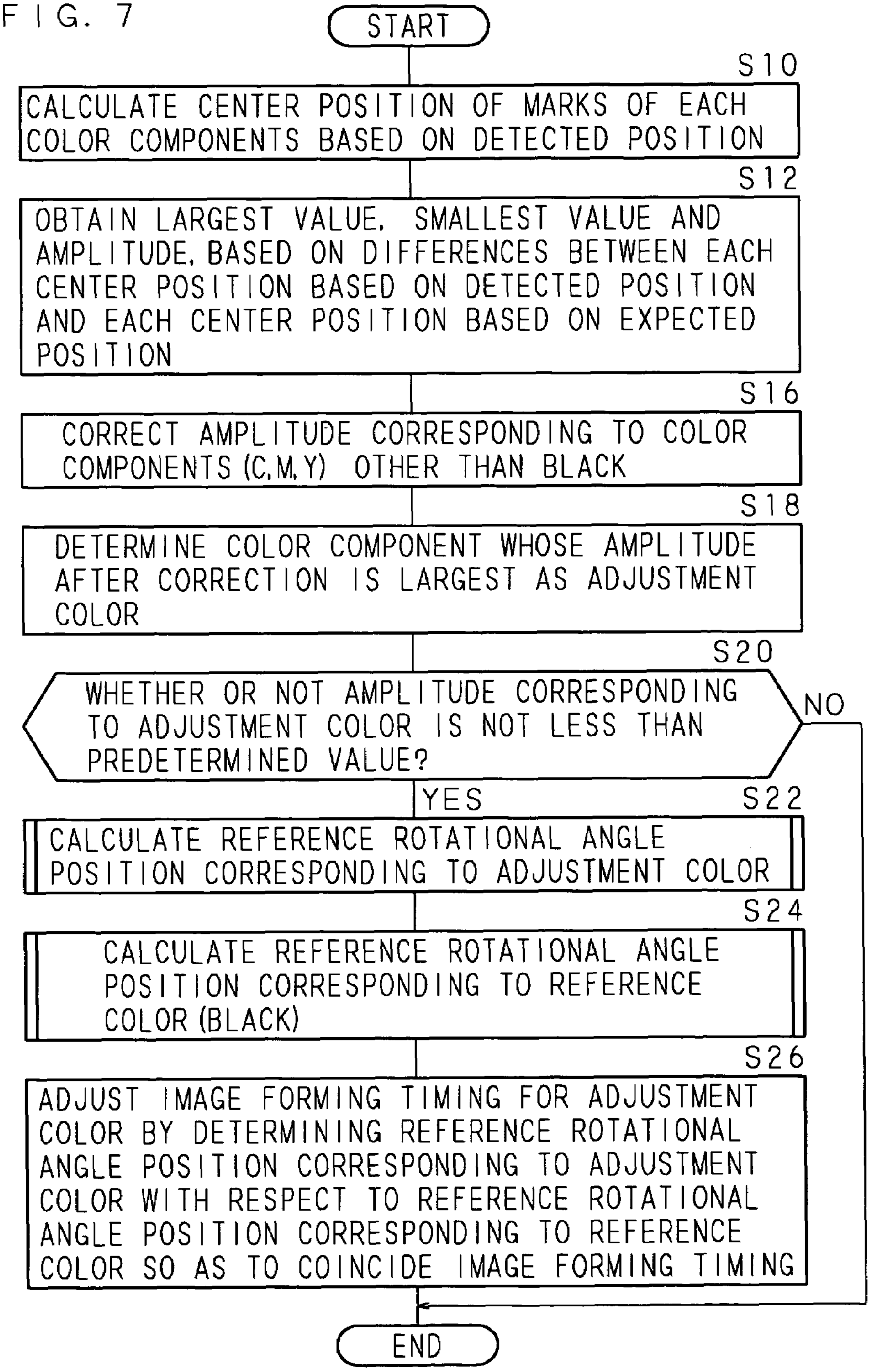
FIG. 7 is a flowchart showing an example of timing adjustment procedure for image forming related to a reference rotational angle position.

FIG. 7 is a flowchart showing an example of timing adjustment procedure for image forming related to the reference rotational angle position. First, under the control of the control unit 60, a plurality of reference marks and a plurality of adjustment marks for each color are formed on the transfer belt 30 at a predetermined interval. The control unit 60 calculates the center position of the marks of each of the color components based on the front end position and the rear end position detected by the CCD 34 (S10), and stores the calculated result in the RAM 68. Subsequently, with respect to each of the reference marks (black) and the marks of the color components (cyan, magenta and yellow) other than black, the control unit 60 obtains the largest value, the smallest value and the amplitude, based on the differences between each center position calculated based on the detected position and each center position calculated based on the expected position at which the mark is to be formed (S12), and stores them in the RAM 68. Subsequently, the control unit 60 corrects the amplitude corresponding to the color components (cyan, magenta and yellow) other than black (S16). The correction may be performed by halving the amplitude corresponding to yellow, for example.

The control unit 60 determines the color component whose amplitude after correction is largest as the adjustment color (color to be adjusted) (S18), and checks whether or not the amplitude corresponding to the determined adjustment color is not less than a predetermined value (S20). When the amplitude corresponding to the adjustment color is smaller than the predetermined value (S20: NO), the control unit 60 does not perform the timing adjustment. When the amplitude corresponding to the adjustment color is not less than the predetermined value (S20: YES), the control unit 60 calculates the reference rotational angle position corresponding to the adjustment color (S22), and stores the calculated result in the RAM 68. Further, the control unit 60 calculates the reference rotational angle position corresponding to the reference color (black) (S24), and stores the calculated result in the RAM 68. Then, the control unit 60 adjusts the image forming timing for the adjustment color by determining the reference rotational angle position corresponding to the adjustment color with respect to the reference rotational angle position corresponding to the reference color so as to coincide the image forming timing on the transfer belt 30 (S26). By doing so, even when periodic color misregistration due to the eccentricity of a photosensitive drum is caused between the reference color and the adjustment color, the colors are so adjusted as to deviate in the same cycle, whereby the color misregistration is prevented from becoming conspicuous.

Figure 8A:
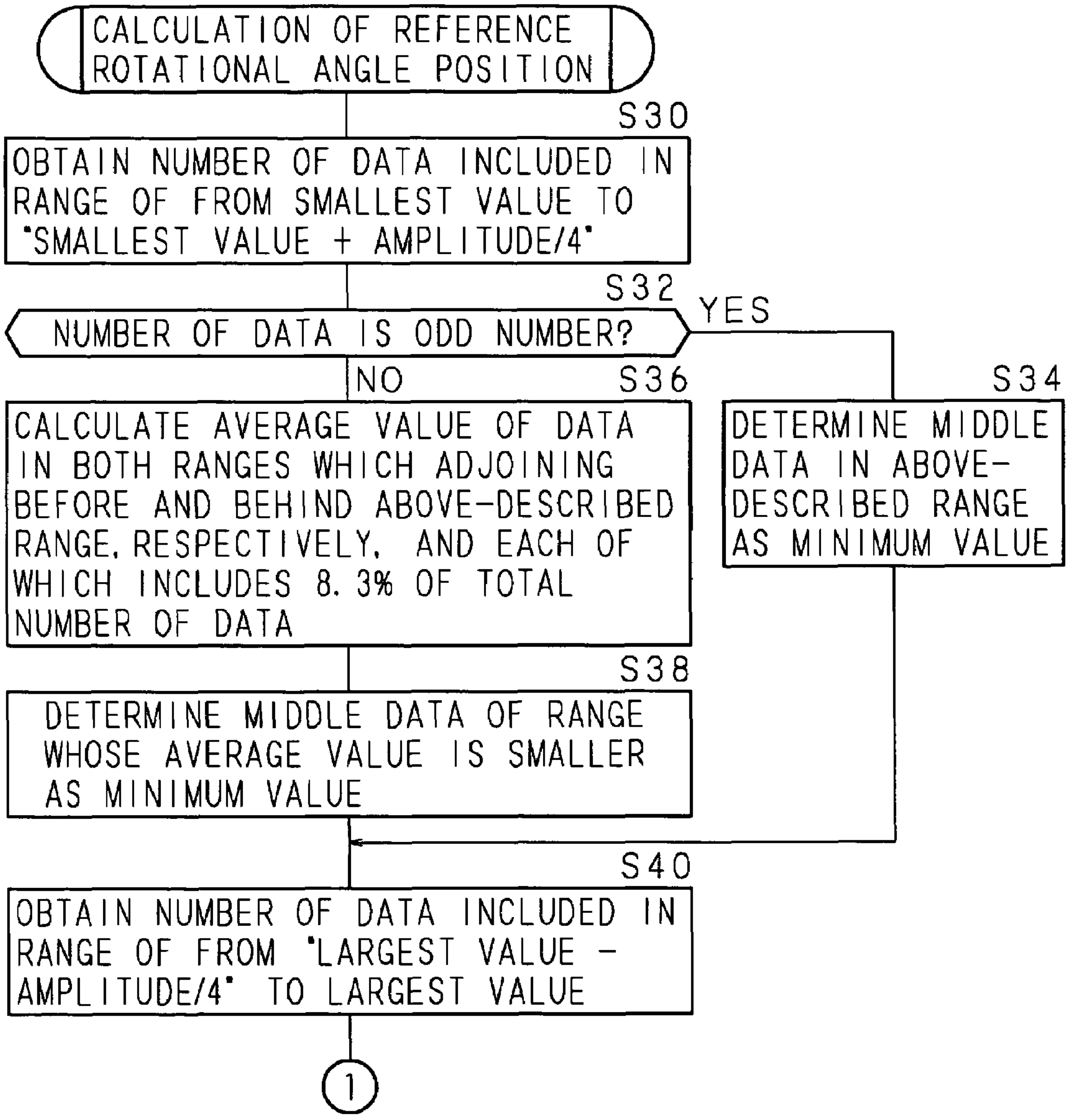
FIG. 8A and FIG. 8B are a flowchart showing an example of calculating procedure of the reference rotational angle position.
Figure 8B:
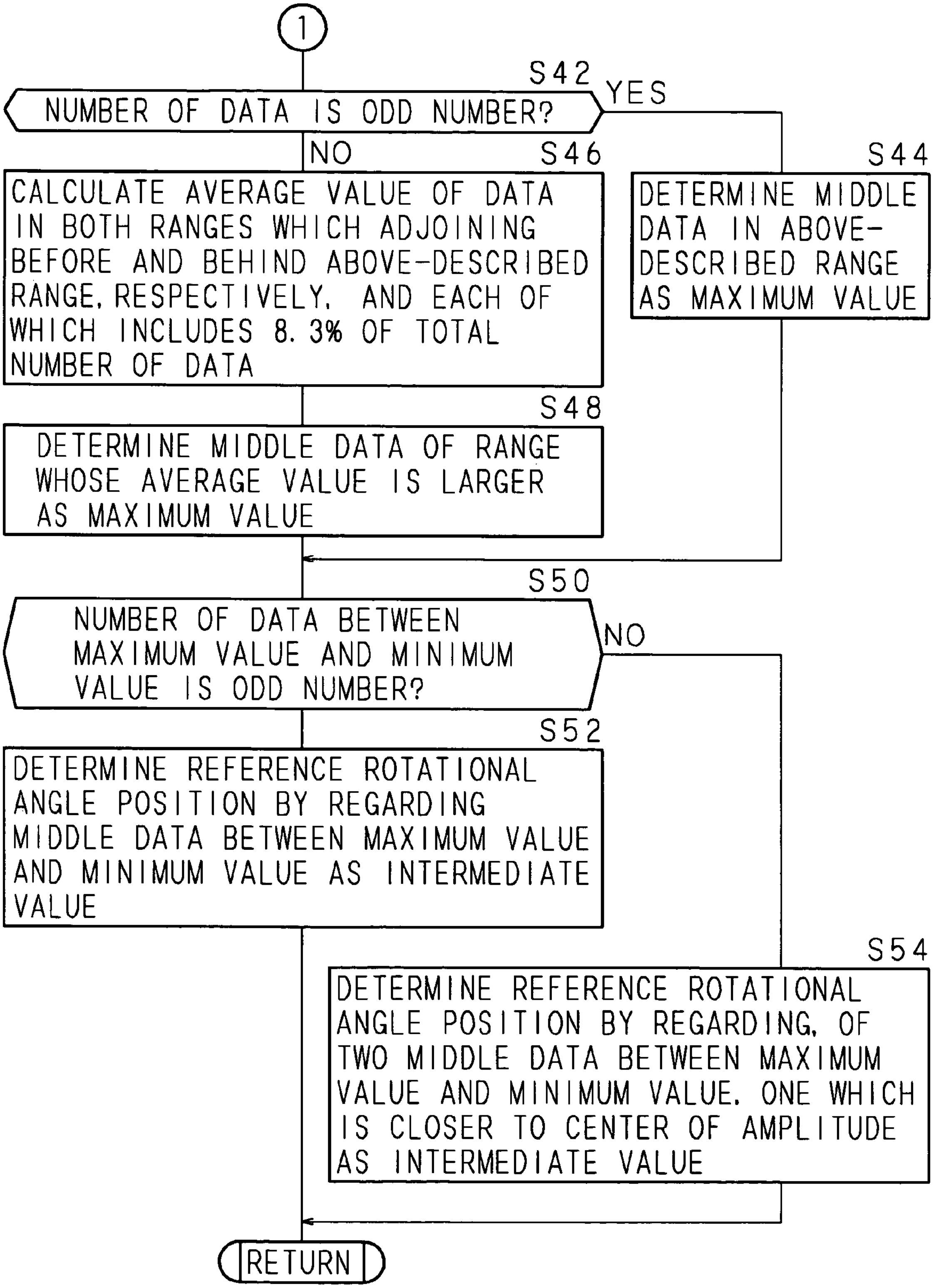

FIG. 8A and FIG. 8B are a flowchart showing an example of calculating procedure of the reference rotational angle position in steps S22 and S24 of the flowchart of FIG. 7.

First, the control unit 60 obtains the number of data included in the range of from the smallest value to "smallest value+amplitude/4" (S30), and stores it in the RAM 68. When the number of data is an odd number (S32: YES), the control unit 60 determines the middle data in the above-described range as the minimum value (S34), and stores it in the RAM 68. When the number of data is an even number (S32: NO), the control unit 60 calculates the average value of the data in the both ranges which adjoining before and behind the above-described range, respectively, and each of which includes 8.3% of the total number of data (S36), and stores the calculated result in the RAM 68. Then, of the respective middle data of the both ranges, the control unit 60 determines the middle data of the range whose average value is smaller as the minimum value (S38), and stores it in the RAM 68.

Next, the control unit 60 obtains the number of data included in the range of from "largest value−amplitude/4" to the largest value (S40), and stores it in the RAM 68. When the number of data is an odd number (S42: YES), the control unit 60 determines the middle data in the above-described range as the maximum value (S44), and stores it in the RAM 68. When the number of data is an even number (S42: NO), the control unit 60 calculates the average value of the data in the both ranges which adjoining before and behind the above-described range, respectively, and each of which includes 8.3% of the total number of data (S46), and stores the calculated result in the RAM 68. Then, of the respective middle data of the both ranges, the control unit 60 determines the middle data of the range whose average value is larger as the maximum value (S48), and stores it in the RAM 68.

When the number of data between the maximum value and the minimum value is an odd number (S50: YES), the control unit 60 determines the reference rotational angle position by regarding the middle data between the maximum value and the minimum value as the intermediate value (S52), and stores it in the RAM 68. When the number of data between the maximum value and the minimum value is an even number (S50: NO), the control unit 60 determines the reference rotational angle position by regarding, of the two middle data between the maximum value and the minimum value, the one which is closer to the center of the amplitude as the intermediate value (S54), and stores it in the RAM 68.

Instead of expressing the interval between marks in terms of time period, as described above, the interval can be expressed in terms of the distance corresponding to the time period or the number of dots corresponding to the time period.

Figure 9:
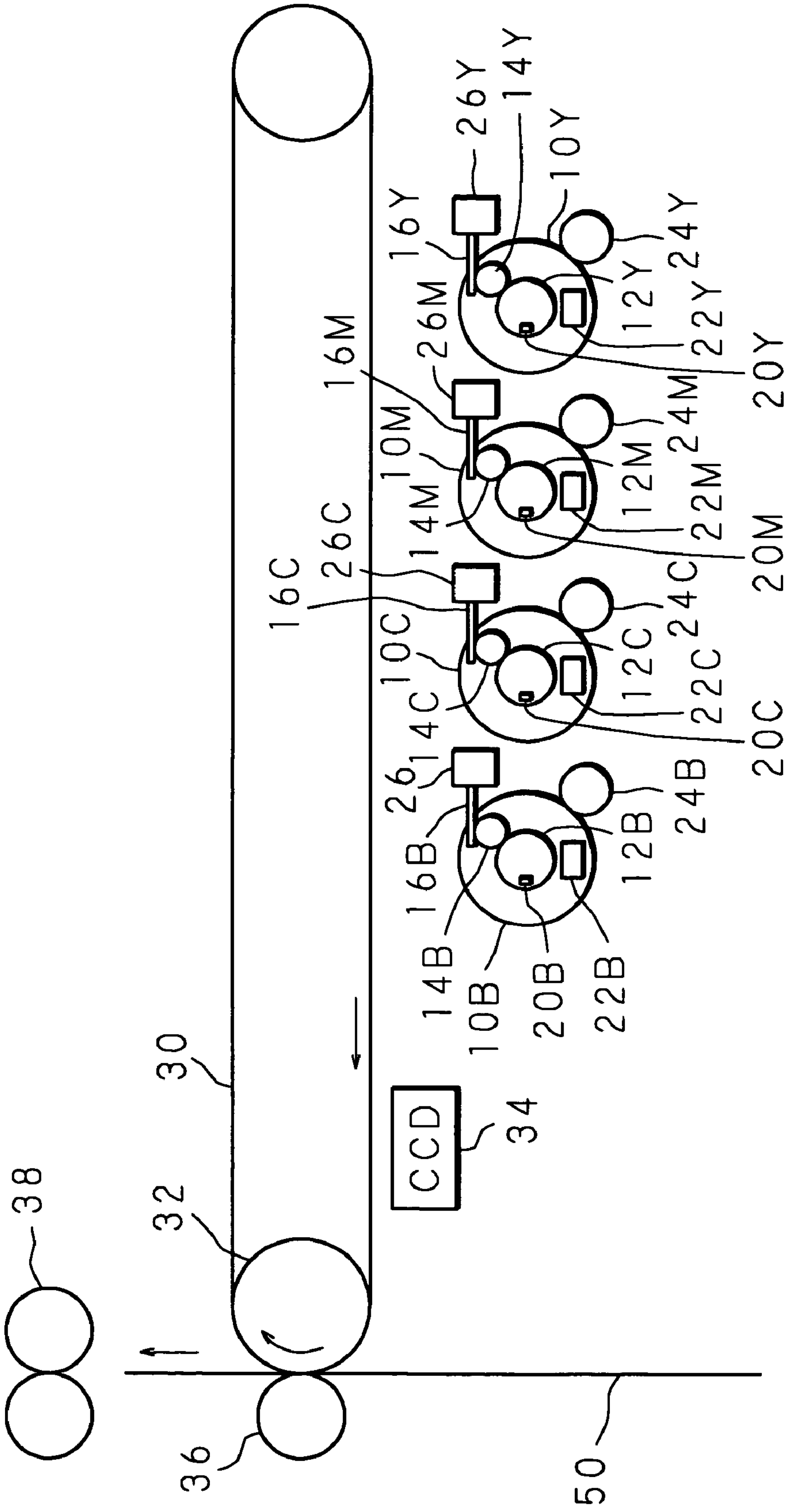
FIG. 9 is a schematic view showing a constitutional example of photosensitive drums and a driving system for driving the photosensitive drums for adjustment colors driven by individual motors.

In the embodiment described above, the photosensitive drums 10C, 10M and 10Y for adjustment colors are designed to be driven by the common motor 28. However, the photosensitive drums 10C, 10M and 10Y for adjustment colors may be driven by individual motors. FIG. 9 is a schematic view showing a constitutional example of photosensitive drums and a driving system for driving the photosensitive drums 10C, 10M and 10Y for adjustment colors driven by individual motors. The worm wheel 14C for cyan meshes with worm 16C driven by individual motors 26C, the worm wheel 14M for magenta meshes with worm 16M driven by individual motors 26M and the worm wheel 14Y for yellow meshes with worm 16Y driven by individual motors 26Y, respectively.

Figure 10:
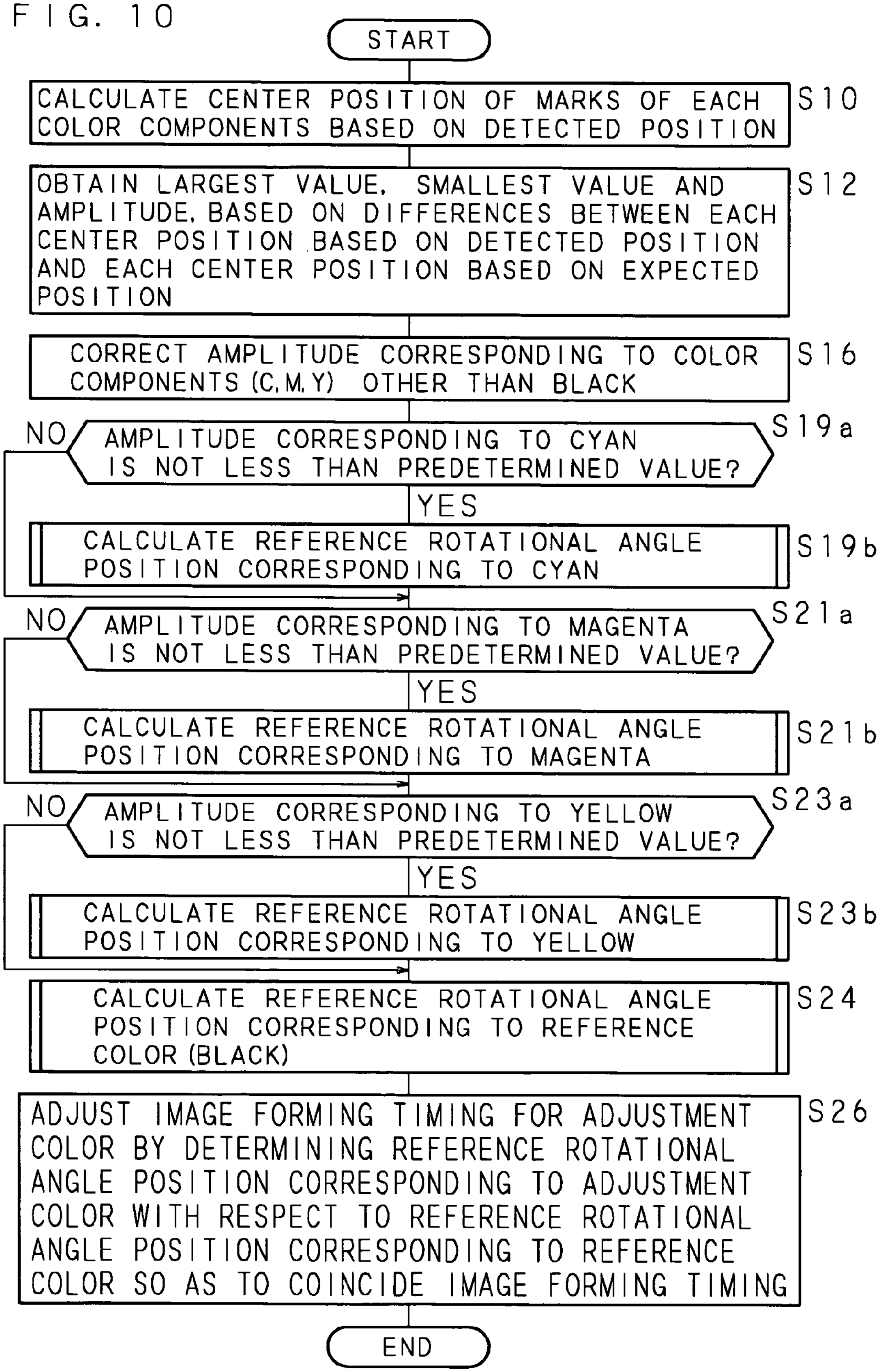
FIG. 10 is a flowchart showing an example of timing adjustment process for image forming related to a reference rotational angle position in the case where the photosensitive drums for adjustment colors are driven by individual motors.

FIG. 10 is a flowchart showing an example of timing adjustment procedure for image forming related to the reference rotational angle position in the case where the photosensitive drums 10C, 10M and 10Y for adjustment colors are driven by individual motors 26C, 26M and 26Y, respectively.

In steps of S10, S12, S16, S24 and S26 in FIG. 10, the process are performed similarly to those of the flowchart of FIG. 7. The control unit 60 corrects the amplitude corresponding to the color components other than black (S16). Thereafter, when the amplitude corresponding to cyan is not less than a predetermined value (S19*a:* YES), the control unit 60 calculates the reference rotational angle position corresponding to cyan (S19*b*), and stores the calculated result in the RAM 68. On the other hand, when the amplitude corresponding to magenta is not less than a predetermined value (S21*a:* YES), the control unit 60 calculates the reference rotational angle position corresponding to magenta (S21*b*), and stores the calculated result in the RAM 68. When the amplitude corresponding to yellow is not less than a predetermined value (S23*a:* YES), the control unit 60 calculates the reference rotational angle position corresponding to yellow (S23*b*), and stores the calculated result in the RAM 68. Thereafter, the control unit 60 calculates the reference rotational angle position corresponding to black (S24), and stores the calculated result in the RAM 68. With respect to the adjustment color for which the reference rotational angle position is calculated, the control unit 60 adjusts the image forming timing for the adjustment color by determining the reference rotational angle position corresponding to the adjustment color with respect to the reference rotational angle position corresponding to the reference color so as to coincide the image forming timing on the transfer belt 30 (S26).

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:

1. An image forming apparatus comprising:

a plurality of image carriers which are simultaneously rotated;

an image forming unit for forming each of color component images of a plurality of colors on each of corresponding image carriers among said plurality of image carriers, respectively;

a transfer medium to which each of color component images formed on each of said image carriers is to be transferred;

a position detecting unit for detecting a position, on said transfer medium, of each of color component images transferred to said transfer medium; and a timing adjusting unit for adjusting timing at which each of color component images is to be formed on each of said image carriers, respectively, by said image forming unit based on the positions of each of color component images on said transfer medium detected by said position detecting unit;

wherein said image forming unit includes:

a plurality of irradiators for, with same timing, emitting light beams corresponding to each of said image carriers, respectively; and a single polygon mirror for reflecting, by a same reflecting surface, the light beams emitted with the same timing from said plurality of irradiators toward the corresponding image carriers, respectively so that each of color component images is formed on each of said corresponding image carriers with same timing; and the each of color component images of a plurality of colors is formed simultaneously on the corresponding image carrier among said plurality of image carriers; and an interval between the color component images transferred to said transfer medium becomes substantially equal to an interval between the corresponding image carriers.

2. The image forming apparatus as set forth in claim 1, wherein said image forming unit forms a plurality of color component images of a same color on said transfer medium, and said position detecting unit detects positions of the plurality of color component images of the same color on said transfer medium, and calculates an average value of the detected positions as a position of each of color component images.

3. The image forming apparatus as set forth in claim 1, further comprising: a rotational angle position detecting unit for detecting a rotational angle position of each image carrier; and a reference rotational angle position detecting unit for detecting a reference rotational angle position that is a rotational angle position where image forming timing on said transfer medium by said image carrier as a photosensitive drum having cylindrical shape coincides, wherein said image forming unit forms a plurality of color component images of a same color on said transfer medium, said position detecting unit detects positions of the plurality of color component images of the same color on said transfer medium, said reference rotational angle detecting unit detects the reference rotational angle position of each said image carrier based on the positions of the plurality of color component images of the same color detected by said position detecting unit, and said timing adjusting unit adjusts the image forming timing by determining the reference rotational angle position corresponding to the adjustment color with respect to the reference rotational angle position corresponding to the reference color so as to coincide the image forming timing on said transfer medium, based on the rotational angle position of each of said image carrier detected by said rotational angle position detecting unit and the reference rotational angle position of each of said image carrier detected by said reference rotational angle position detecting unit.

4. The image forming apparatus as set forth in claim 3, wherein said image forming unit forms each of color component images at a predetermined interval, and said reference rotational angle position detecting unit selects a maximum value and a minimum value from differences between forming positions of each of color component images formed on said transfer medium detected by said position detecting unit and position corresponding to the predetermined interval, calculates an intermediate value between said selected maximum value and said selected minimum value, and detects the reference rotational angle position based on said calculated intermediate value.

5. The image forming apparatus as set forth in claim 1, wherein one of said plurality of color component images is determined as a reference color image serving as reference for adjustment, whereas other color component images are determined as adjustment color images which are to be adjusted, and said timing adjusting unit adjusts timing of image forming so that difference between a detected position of each of said adjustment color images on said transfer medium detected by said detecting unit and a prescribed position is not more than a predetermined value, based on a forming position of said reference color image on said transfer medium as reference.

6. The image forming apparatus as set forth in claim 5, wherein said image forming unit forms a plurality of color component images of a same color on said transfer medium, and said position detecting unit detects positions of the plurality of color component images of the same color on said transfer medium, and calculates an average value of the detected positions as a position of each of color component images.

7. The image forming apparatus as set forth in claim 5, further comprising: a rotational angle position detecting unit for detecting a rotational angle position of each image carrier; and a reference rotational angle position detecting unit for detecting a reference rotational angle position that is a rotational angle position where image forming timing on said transfer medium by said image carrier as a photosensitive drum having cylindrical shape coincides, wherein said image forming unit forms a plurality of color component images of a same color on said transfer medium, said position detecting unit detects positions of the plurality of color component images of the same color on said transfer medium, said reference rotational angle detecting unit detects the reference rotational angle position of each said image carrier based on the positions of the plurality of color component images of the same color detected by said position detecting unit, and said timing adjusting unit adjusts the image forming timing by determining the reference rotational angle position corresponding to the adjustment color with respect to the reference rotational angle position corresponding to the reference color so as to coincide the image forming timing on said transfer medium, based on the rotational angle position of each of said image carrier detected by said rotational angle position detecting unit and the reference rotational angle position of each of said image carrier detected by said reference rotational angle position detecting unit.

8. The image forming apparatus as set forth in claim 7, wherein said image forming unit forms each of color component images at a predetermined interval, and said reference rotational angle position detecting unit selects a maximum value and a minimum value from differences between forming positions of each of color component images formed on said transfer medium detected by said position detecting unit and position corresponding to the predetermined interval, calculates an intermediate value between said selected maximum value and said selected minimum value, and detects the reference rotational angle position based on said calculated intermediate value.

9. The image forming apparatus as set forth in claim 5, wherein said predetermined value differs among color components.

10. The image forming apparatus as set forth in claim 5, wherein at least two of said plurality of image carriers comprise photosensitive drums rotated by a common motor, and said timing adjusting unit adjusts timing of image forming with respect to a color component of which difference between the detected position and the prescribed position is largest among the color components corresponding to said plurality of photosensitive drums rotated by said common motor.

11. An image forming apparatus comprising:

a plurality of image carriers which are simultaneously rotated;

an image forming unit for forming each of color component images of a plurality of colors on each of corresponding image carriers among said plurality of image carriers, respectively;

a transfer medium to which each of color component images formed on each of said image carriers is to be transferred;

a position detecting unit for detecting a position, on said transfer medium, of each of color component images transferred to said transfer medium; and a controller, coupled with said image forming unit and said position detecting unit, capable of performing the following operation of adjusting timing at which each of color component images is to be formed on each of said image carriers, respectively, by said image forming unit based on the positions of each of color component images on said transfer medium detected by said position detecting unit; wherein said image forming unit includes:

a plurality of irradiators for emitting light beams corresponding to each of said image carriers, respectively; and a single polygon mirror for reflecting the light beams emitted from said plurality of irradiators toward the corresponding image carriers, respectively so that each of color component images is formed on each of said corresponding image carriers, and said controller further capable of performing the following operations of:

causing said plurality of irradiators to emitting light beams with same timing, respectively; and forming color component images on each of said corresponding image carriers with same timing by reflecting the light beams emitted with the same timing from said plurality of irradiators toward the corresponding image carriers, respectively by a same reflecting surface of said single polygon mirror; and the each of color component images of a plurality of colors is formed simultaneously on the corresponding image carrier among said plurality of image carriers; and an interval between the color component images transferred to said transfer medium becomes substantially equal to an interval between the corresponding image carriers.

12. The image forming apparatus as set forth in claim 11, wherein said controller further capable of performing the following operations of:

causing said image forming unit to forms plurality of color component images of a same color on said transfer medium;

causing said position detecting unit to detect positions of the plurality of color component images of the same color on said transfer medium; and calculating an average value of the detected positions as a position of each of said color component images detected by said position detecting unit.

13. The image forming apparatus as set forth in claim 11, further comprising a rotational angle position detecting unit for detecting a rotational angle position of each image carrier, wherein said controller further capable of performing the following operations of:

detecting a reference rotational angle position that is a rotational angle position where image forming timing on said transfer medium by said image carrier as a photosensitive drum having cylindrical shape coincides;

causing said image forming unit to form a plurality of color component images of a same color on said transfer medium, causing said position detecting unit to detect positions of the plurality of color component images of the same color formed by image forming unit on said transfer medium, detecting the reference rotational angle position of each said image carrier based on the positions of the plurality of color component images of the same color detected by said position detecting unit, and adjusting the image forming timing by determining the reference rotational angle position corresponding to the adjustment color with respect to the reference rotational angle position corresponding to the reference color so as to coincide the image forming timing on said transfer medium, based on the rotational angle position of each of said image carrier detected by said rotational angle position detecting unit and the reference rotational angle position of each of said image carrier detected by said reference rotational angle position detecting unit.

14. The image forming apparatus as set forth in claim 13, wherein said controller further capable of performing the following operations of:

causing said image forming unit to form each of color component images at a predetermined interval;

selecting a maximum value and a minimum value from differences between respective forming positions of each of color component images formed on said transfer medium detected by said position detecting unit and position corresponding to the predetermined interval;

calculating an intermediate value between said selected maximum value and said selected minimum value; and detecting the reference rotational angle position based on said calculated intermediate value.

15. The image forming apparatus as set forth in claim 11, wherein one of said plurality of color component images is determined as a reference color image serving as reference for adjustment, whereas other color component images are determined as adjustment color images which are to be adjusted, and said controller further capable of performing the following operation of adjusting timing of image forming so that difference between a detected position of each of said adjustment color images on said transfer medium detected by said detecting unit and a prescribed position is not more than a predetermined value, based on a forming position of said reference color image on said transfer medium as reference.

16. The image forming apparatus as set forth in claim 15, wherein said controller further capable of performing the following operations of:

causing said image forming unit to forms plurality of color component images of a same color on said transfer medium;

causing said position detecting unit to detect positions of the plurality of color component images of the same color on said transfer medium; and calculating an average value of the detected positions as a position of each of said color component images detected by said position detecting unit.

17. The image forming apparatus as set forth in claim 15, further comprising a rotational angle position detecting unit for detecting a rotational angle position of each image carrier, wherein said controller further capable of performing the following operations of:

detecting a reference rotational angle position that is a rotational angle position where image forming timing on said transfer medium by said image carrier as a photosensitive drum having cylindrical shape coincides;

causing said image forming unit to form a plurality of color component images of a same color on said transfer medium, causing said position detecting unit to detect positions of the plurality of color component images of the same color formed by image forming unit on said transfer medium, detecting the reference rotational angle position of each said image carrier based on the positions of the plurality of color component images of the same color detected by said position detecting unit, and adjusting the image forming timing by determining the reference rotational angle position corresponding to the adjustment color with respect to the reference rotational angle position corresponding to the reference color so as to coincide the image forming timing on said transfer medium, based on the rotational angle position of each of said image carrier detected by said rotational angle position detecting unit and the reference rotational angle position of each of said image carrier detected by said reference rotational angle position detecting unit.

18. The image forming apparatus as set forth in claim 17, wherein said controller further capable of performing the following operations of:

causing said image forming unit to form each of color component images at a predetermined interval;

selecting a maximum value and a minimum value from differences between respective forming positions of each of color component images formed on said transfer medium detected by said position detecting unit and position corresponding to the predetermined interval;

calculating an intermediate value between said selected maximum value and said selected minimum value; and detecting the reference rotational angle position based on said calculated intermediate value.

19. The image forming apparatus as set forth in claim 15, wherein said predetermined value differs among color components.

20. The image forming apparatus as set forth in claim 15, wherein at least two of said plurality of image carriers comprise photosensitive drums rotated by a common motor, and said controller further capable of performing the following operation of adjusting timing of image forming with respect to a color component of which difference between the detected position and the prescribed position is largest among the color components corresponding to said plurality of photosensitive drums rotated by said common motor.

* * * * *